United States Patent
Ko et al.

(10) Patent No.: US 6,892,327 B2
(45) Date of Patent: May 10, 2005

(54) METHOD OF VERIFYING DEFECT MANAGEMENT AREA INFORMATION OF OPTICAL DISC UPON INITIALIZATION WITH CERTIFICATION AND TEST APPARATUS FOR PERFORMING THE SAME

(75) Inventors: Jung-wan Ko, Yongin (KR); Hyun-kwon Chung, Kwangju-gun (KR)

(73) Assignee: Samsung Electronics Co., LTD, Suwon-Si (KR)

(*) Notice: Subject to any disclaimer, the term of this patent is extended or adjusted under 35 U.S.C. 154(b) by 645 days.

(21) Appl. No.: 09/805,438

(22) Filed: Mar. 14, 2001

(65) Prior Publication Data

US 2001/0033536 A1 Oct. 25, 2001

Related U.S. Application Data (60) Provisional application No. 60/195,472, filed on Apr. 10, 2000.

(30) Foreign Application Priority Data

Apr. 8, 2000 (KR) .................................... 2000-18502

(51) Int. Cl.[7] ............................................. G06F 11/00
(52) U.S. Cl. .................... 714/42; 714/25; 369/53.12; 369/53.15; 369/53.44
(58) Field of Search .................. 714/42, 25; 369/47.14, 369/53.31, 53.13, 53.12, 53.44, 53.1, 53.15; 360/31

(56) References Cited

U.S. PATENT DOCUMENTS

| | | | |
|---|---|---|---|
| 4,631,723 A | * 12/1986 | Rathbun et al. | ............ 714/710 |
| 5,404,357 A | 4/1995 | Ito et al. | |
| 5,568,454 A | * 10/1996 | Shima et al. | ............ 369/13.28 |

(Continued)

FOREIGN PATENT DOCUMENTS

| | | |
|---|---|---|
| DE | 198 59 529 | 7/1999 |
| DE | 199 42 438 | 3/2000 |
| JP | 55-064660 | 5/1980 |
| JP | 03-016025 | 1/1991 |
| JP | 05-002837 | 1/1993 |
| JP | 05-307836 | 11/1993 |
| JP | 06-349201 | 12/1994 |
| JP | 09-213011 | 8/1997 |
| JP | 10-144011 | 5/1998 |
| JP | 2000-003562 | 1/2000 |

OTHER PUBLICATIONS

OSTA.MultiRead2: Test Plan for MultiRead2. Dec. 6, 1999. pp. 1–14.*

U.S. Appl. No. 09/805,443, filed Mar. 14, 2001, Jung Wan Ko et al. Samsung Electronics Co., Ltd.

U.S. Appl. No. 09/805,437, filed Mar. 14, 2001, Jung Wan Ko et al. Samsung Electronics Co., Ltd.

(Continued)

*Primary Examiner*—Robert Beausoliel
*Assistant Examiner*—Yolanda T. Wilson
(74) *Attorney, Agent, or Firm*—Staas & Halsey LLP (57) ABSTRACT

A method of verifying defect management area (DMA) information of an optical disc upon initialization with certification, and a test apparatus for performing the same. The method includes generating, as test information, defect management information, which is generated after performing initialization with certification on a test disc, which is obtained by making known physical defects on a blank disc, and verifying the test information using reference test information for initialization with certification to provide the test result. Accordingly, it can be easily verified that a recording and reproducing apparatus properly translates and processes DMA information which is generated after initialization with certification, using a test disc with known physical defects.

63 Claims, 6 Drawing Sheets

U.S. PATENT DOCUMENTS

| | | | | | |
|---|---|---|---|---|---|
| 5,966,358 | A | * | 10/1999 | Mine | 369/47.14 |
| 6,088,664 | A | * | 7/2000 | MacPherson | 702/183 |
| 6,119,239 | A | * | 9/2000 | Fujii | 713/320 |
| 6,154,858 | A | * | 11/2000 | Ottesen et al. | 714/42 |
| 6,467,054 | B1 | * | 10/2002 | Lenny | 714/42 |
| 6,480,446 | B1 | | 11/2002 | Ko | |
| 6,526,522 | B1 | * | 2/2003 | Park et al. | 714/8 |
| 6,542,450 | B1 | * | 4/2003 | Park | 369/53.15 |
| 6,601,201 | B1 | * | 7/2003 | Kato | 714/724 |
| 2003/0133379 | A1 | * | 7/2003 | Shin | 369/53.17 |
| 2003/0135800 | A1 | * | 7/2003 | Kim et al. | 714/719 |

OTHER PUBLICATIONS

U.S. Appl. No. 09/805,436, filed Mar. 14, 2001, Jung Wan Ko et al. Samsung Electronics Co., Ltd.

U.S. Appl. No. 09/805,446, filed Mar. 14, 2001, Jung Wan Ko et al. Samsung Electronics Co., Ltd.

U.S. Appl. No. 09/805,447, filed Mar. 14, 2001, Jung Wan Ko et al. Samsung Electronics Co., Ltd.

U.S. Appl. No. 09/805,439, filed Mar. 14, 2001, Jung Wan Ko et al. Samsung Electronics Co., Ltd.

U.S. Appl. No. 09/805,448, filed Mar. 14, 2001, Jung Wan Ko et al. Samsung Electronics Co., Ltd.

U.S. Appl. No. 09/805,444, filed Mar. 14, 2001, Jung Wan Ko et al. Samsung Electronics Co., Ltd.

English language Abstract of Japanese Application No.: 11–255750, published Jan. 29, 1999.

* cited by examiner

| Class | Items | | Byte Position | of bytes | Expected value |
|---|---|---|---|---|---|
| DMA | Error condition of DMA | DMA1 | NA | NA | No uncorrectable error |
| | | DMA2 | NA | NA | No uncorrectable error |
| | | DMA3 | NA | NA | No uncorrectable error |
| | | DMA4 | NA | NA | No uncorrectable error |
| | DDS/PDL and SDL Update counters | DDS/PDL update counter in DDS1 | 4 to 7 | 4 | M+k |
| | | DDS/PDL update counter in SDL1 | 16 to 19 | 4 | M+k |
| | | DDS/PDL update counter in DDS2 | 4 to 7 | 4 | M+k |
| | | DDS/PDL update counter in SDL2 | 16 to 19 | 4 | M+k |
| | | DDS/PDL update counter in DDS3 | 4 to 7 | 4 | M+k |
| | | DDS/PDL update counter in SDL3 | 16 to 19 | 4 | M+k |
| | | DDS/PDL update counter in DDS4 | 4 to 7 | 4 | M+k |
| | | DDS/PDL update counter in SDL4 | 16 to 19 | 4 | M+k |
| | | SDL update counter in SDL1 | 4 to 7 | 4 | N+k |
| | | SDL update counter in SDL2 | 4 to 7 | 4 | N+k |
| | | SDL update counter in SDL3 | 4 to 7 | 4 | N+k |
| | | SDL update counter in SDL4 | 4 to 7 | 4 | N+k |
| | Contents of DMA | DMA1 | NA | | Should be identical |
| | | DMA2 | NA | | Should be identical |
| | | DMA3 | NA | | Should be identical |
| | | DMA4 | NA | | Should be identical |

FIG. 3

| Class | Items | | Byte Position | of bytes | Expected value | |
|---|---|---|---|---|---|---|
| DDS | DDS Identifier | | 0 to 1 | 2 | 0A0Ah | |
| | reserved | | 2 | 1 | 00h | |
| | Disc Certification flag | | 3 | 1 | b7 | 0b |
| | | | | | b6-b2 | All 0b |
| | | | | | b1 | 1b |
| | | | | | b0 | 0b |
| | DDS/PDL update counter | | 4 to 7 | 4 | M+k | |
| | Number of Groups | | 8 to 9 | 2 | 0001h | |
| | Number of zones | | 10 to 11 | 2 | 0023h | |
| | reserved | | 12 to 79 | 68 | All 00h | |
| | Location of Primary spare area | | 80 to 87 | 8 | b63-b56 | 00h |
| | | | | | b55-b32 | 031000h |
| | | | | | b31-b24 | 00h |
| | | | | | b23-b0 | 0341FFh |
| | Location of LSN0 | | 88 to 91 | 4 | b31-b24 | 00h |
| | | | | | b23-b0 | - |
| | reserved | | 92 to 255 | 164 | All 00h | |
| | Start LSN for each zone | Zone1 | 256 to 259 | 140 | b31-b24 | 00h |
| | | Zone2 | 260 to 263 | | b23-b0 | - |
| | | ... | ... | | b31-b24 | 00h |
| | | | | | b23-b0 | - |
| | | | | | ... | ... |
| | | Zone34 | 392 to 395 | | b31-b24 | 00h |
| | | | | | b23-b0 | - |
| | reserved | | 396 to 2047 | 1652 | All 00h | |

FIG. 4

| Class | Items | | | Byte Position | of bytes | Expected value | |
|---|---|---|---|---|---|---|---|
| PDL | PDL Identifier | | | 0 to 1 | 2 | 0001h | |
| | Number of entries in PDL | | | 2 to 3 | 2 | $E_{PDL}$ | |
| | Integrity of PDL entries | First PDL entry | | 4 to 7 | 4 | b31-b30 | 10b |
| | | | | | | b23-b0 | 10b |
| | | Second PDL entry | | 8 to 11 | 4 | b31-b30 | 10b |
| | | | | | | b23-b0 | 10b |
| | | ... | | ... | ... | ... | ... |
| | | Last PDL entry | | n to n+3 | 4 | b31-b30 | 10b |
| | | | | | | b23-b0 | 10b |
| | Size of PDL | | | | | $4 \times E_{PDL}+4$ | |
| | Un-used area | | | n+4 to 30719 | | FFh | |

FIG. 5

| Class | Items | | Byte Position | of bytes | Expected value | |
|---|---|---|---|---|---|---|
| SDL | SDL identifier | | 0 to 1 | 2 | 0002h | |
| | reserved | | 2 to 3 | 2 | 00h | |
| | SDL Update counter | | 4 to 7 | 4 | N+k | |
| | Start sector number of SSA | | 8 to 11 | 4 | b31-b24 | 00h |
| | | | | | b23-b0 | - |
| | Total number of logical sectors | | 12 to 15 | 4 | | |
| | DDS/PDL Update counter | | 16 to 19 | 4 | M+k | |
| | Spare area full flag | | 20 | 1 | b7-b2 | All 0b |
| | | | | | b1 | - |
| | | | | | b0 | - |
| | reserved | | 21 | 1 | 00h | |
| | Number of entries in SDL | | 22 to 23 | 2 | $E_{SDL}$ | |
| | Integrity of SDL entries | First SDL entry | 24 to 31 | 8 | b63-b56 | 00h |
| | | | | | b55-b32 | |
| | | | | | b23-b0 | |
| | | Second SDL entry | 32 to 39 | 8 | b62 | |
| | | | | | b55-b32 | |
| | | | | | b23-b0 | |
| | | ... | ... | ... | ... | ... |
| | | Last SDL entry | m to m+7 | 8 | b62 | |
| | | | | | b55-b32 | |
| | | | | | b23-b0 | |
| | Size of PDL | | | | $8 \times E_{SDL}+24$ | |
| | Un-used SDL area | | m+8 to 32767 | | FFh | |

METHOD OF VERIFYING DEFECT MANAGEMENT AREA INFORMATION OF OPTICAL DISC UPON INITIALIZATION WITH CERTIFICATION AND TEST APPARATUS FOR PERFORMING THE SAME

CROSS-REFERENCE TO RELATED APPLICATIONS

This application claims the benefit of Korean Application No. 00-18502, filed Apr. 8, 2000, in the Korean Patent Office, and U.S. Ser. No. 60/195,472, filed Apr. 10, 2000, in the U.S. Patent & Trademark Office, the disclosures of which are incorporated herein by reference.

BACKGROUND OF THE INVENTION

1. Field of the Invention

The present invention relates to optical disc recording and reproducing technology, and more particularly, to a method of verifying defect management area information of a recordable and reproducible optical disc upon initialization with certification, and a test apparatus for performing the same.

2. Description of the Related Art

Digital versatile disc-random access memory (DVD-RAM) discs have a defect management function of replacing defective areas with normal recordable areas, and storing information necessary for management of the defects in a portion referred to as a defect management area (DMA) thereon. The DMA is repeatedly recorded in four portions on a disc: two portions in a lead-in area and two portions in a lead-out area. DMA information is composed of a disc definition structure (DDS), a primary defect list (PDL) and a secondary defect list (SDL).

DMA information includes information on a spare area and important information on the start logical sector number of each zone, in addition to information on defects, which are detected during certification performed while a disc is being initialized or during use of a disc.

Some information included in DMA can be immediately read and used. On the other hand, DMA includes information, which varies with the positions and the number of defects on a disc. That is, some information, for example, the position information of the start logical sector number of each zone or the position information of a first logical sector number, can be obtained only by performing complex computation according to a given algorithm based on defect information registered in the DMA.

Since such DMA information is closely related to a physical data recording position, a removable recording medium such as an optical disc, which can be used in a given recording and reproducing apparatus even if DMA information on the disc has been generated or updated in another recording and reproducing apparatus, may not be compatible with both recording and reproducing apparatuses when the DMA information is wrong. To overcome this problem, an apparatus and method of verifying that a recording and reproducing apparatus correctly reads DMA information from a disc and correctly records DMA information on the disc is desired.

SUMMARY OF THE INVENTION

To solve the above problem, a first object of the present invention is to provide a method of verifying that defect management area (DMA) information is correctly generated upon initialization with certification in an optical disc recording and reproducing apparatus.

A second object of the present invention is to provide a method of verifying that DMA information is correctly generated upon initialization with certification in a recording and reproducing apparatus for repeatedly recordable and reproducible DVD-RAM discs.

A third object of the present invention is to provide a test apparatus for verifying that DMA information is correctly generated upon initialization with certification in an optical disc recording and reproducing apparatus.

Additional objects and advantages of the invention will be set forth in part in the description which follows and, in part, will be obvious from the description, or may be learned by practice of the invention.

To achieve the above and other objects of the invention, there is provided a method of verifying that DMA information is properly generated in a recording and reproducing apparatus which records or reproduces information on or from an optical disc with DMA information. The method includes the steps of generating as test information, defect management information, which is generated after performing initialization with certification on a test disc, which is obtained by making known physical defects on a blank disc, and verifying the test information using reference test information for the initialization with certification to provide the test result.

To achieve the above objects of the invention, there is also provided an apparatus for testing a recording and reproducing apparatus which records or reproduces information on or from a recordable and reproducible optical disc with DMA information to check whether DMA information is properly generated. The apparatus includes a modified drive unit generating test information from the DMA information contained in the test disc, which is obtained after the recoding and reproducing apparatus performs initialization with certification on a test disc obtained by making known physical defects on a blank disc; and a verifier verifying the test result by verifying the test information using reference test information for initialization with certification.

BRIEF DESCRIPTION OF THE DRAWINGS

The above objects and advantages of the present invention will become more apparent by describing in detail preferred embodiments thereof with reference to the attached drawings in which.

DETAILED DESCRIPTION OF THE PREFERRED EMBODIMENTS

Reference will now made in detail to the present preferred embodiments of the present invention, examples of which are illustrated in the accompanying drawings. The embodiments are described below in order to explain the present invention by referring to the figures.

An optical disc used in the present invention is a phase change recording DVD-RAM having a capacity of 4.7 gigabytes (GB). DVD-RAMs are defined in the DVD specification for rewritable disc version 2.0.

Figure 1:
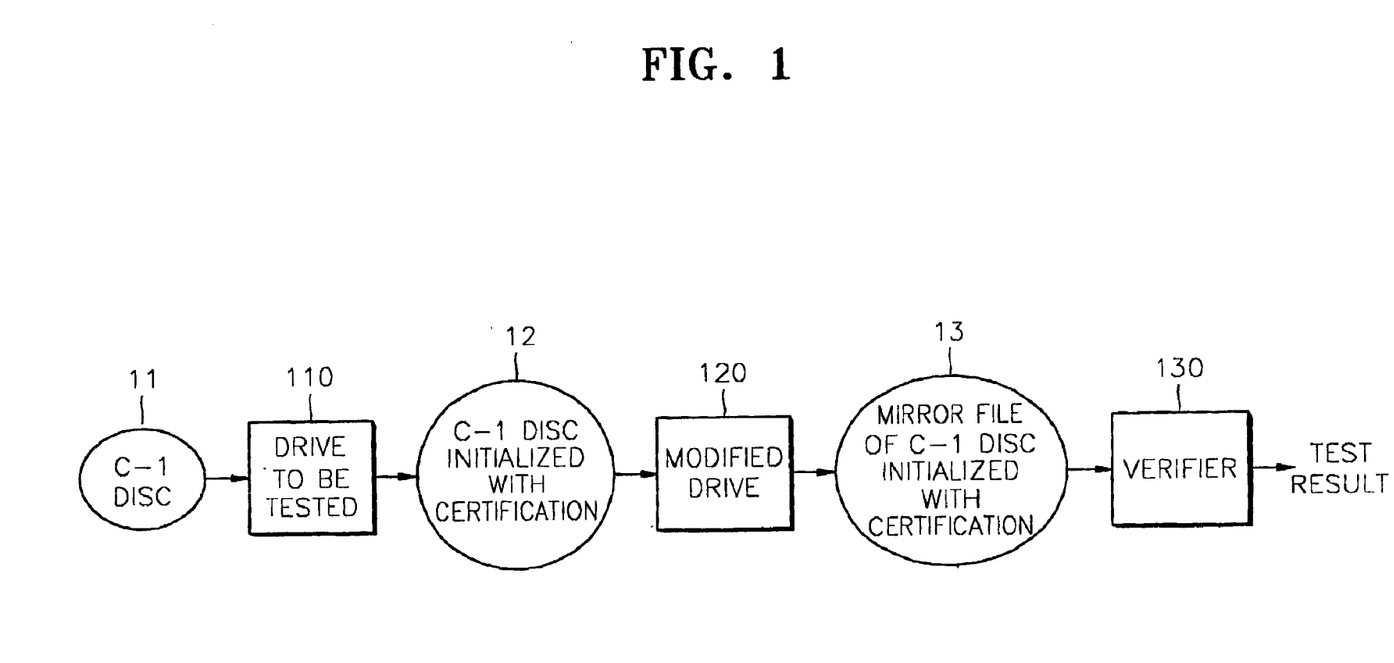
FIG. 1 is a block diagram of a test apparatus for performing a method of verifying defect management area (DMA) information of an optical disc upon initialization with certification according to the present invention.

FIG. 1 is a block diagram of a test apparatus for performing a method of verifying the defect management area (DMA) information of an optical disc upon initialization with certification according to the present invention.

A test disc (hereinafter, referred to as a C-1 disc) 11 is a disc having only known physical defects which are intentionally made at predetermined positions on a blank disc. As long as no "information" is recorded and only known physical defects are present on the C-1 disc 11, the C-1 disc 11 may be regarded as being blank. A drive to be tested 110 performs initialization with certification on the C-1 disc 11 to generate DMA information and records the generated DMA information on the C-1 disc 11. A C-1 disc initialized with certification 12, which is withdrawn from the drive to be tested 110, is loaded into a modified drive 120, which is capable of reading DMA information.

The modified drive 120 is manufactured exclusively for testing and may be referred to as a reference drive. The modified drive 120 reads only the DMA information from the C-1 disc initialized with certification 12 and generates a DMA mirror file 13 of the read DMA information for the C-1 disc initialized with certification 12 in a file system. The drive to be tested 110 is realized as, for example, a DVD-RAM recording and reproducing apparatus, and is designed not to generate a mirror file of the DMA information.

When the recording and reproducing architecture of the DVD-RAM recording and reproducing apparatus is divided into a file system layer, a host interface layer for interfacing a host computer with the recording and reproducing apparatus, a physical drive layer for recording and reproducing physical signals and a recording medium layer, since physical sector numbers of a disc are assigned by a recording medium and a physical drive, and logical sector numbers of a disc are assigned by a host interface and a file system, writing and reading of DMA information is performed in the physical drive layer and the layers therebelow.

Generally, when data is recorded on a recording medium in a computer, a recording position is determined based on a logical sector number assigned by a file system. The file position indicated by a logical sector number is logical and relative position information. When a recording operation is performed in a drive, the logical sector number needs to be converted into a physical sector number indicating a position at which data is actually recorded on a disc, taking into account the physical state such as the state of defects of the disc. However, when user data is actually recorded by the file system, the user data is transmitted to a recording and reproducing apparatus using only the logical sector number, and the recording and reproducing apparatus converts the logical sector number into the physical sector number, which indicates a position at which the data is actually recorded, using defect management information. Accordingly, when defect management information contained in a disc has erroneously been read and written in a given recording and reproducing apparatus, data cannot be exactly read from or written to the disc in another recording and reproducing apparatus.

Moreover, in the case of a DVD-RAM disc, every defect management process is supposed to be performed by a drive so that the file system or the host interface can record or reproduce a file without using information related to completed physical defect management processes. Accordingly, most of the drives are not provided with a function of recording or reproducing information in or from DMA, and moreover, are not provided with a standard command for recording or reproducing information in or from the DMA. However, an environment must be prepared in any way such that data can be read by a computer, which can analyze DMA information, to determine whether the DMA information is properly formed, and it must be possible to record accurate information in a corresponding DMA to make a standard test disc. In order to effectively perform such an operation, a modified drive for recording or reproducing information in or from DMA is provided. This modified drive can be easily designed or obtained by those skilled in the art, and thus a description thereof will be omitted.

A verifier 130 compares the DMA mirror file 13 for the C-1 disc initialized with certification 12, which is generated by the modified drive 120 from the disc with DMA information by the drive to be tested 110, with a reference DMA mirror file for the C-1 disc 11, and informs the manufacturer or user of the result of performing a test to check whether DMA information is properly generated after initialization with certification. The reference DMA mirror file is stored in advance or is provided from the outside (a controller for generating a DMA mirror file) although not shown. The DMA mirror file can be referred to as test information, and the reference DMA mirror file can be referred to as predetermined test information. Moreover, the reference DMA mirror file may be referred to as a DMA information file which contains ideal data without errors, which can occur when a drive normally performs an entire operation.

A verification method according to the present invention includes the steps of generating as test information, a DMA mirror file from DMA information, which is generated after performing initialization with certification on a test disc, which is obtained by making known physical defects on a blank disc, and verifying the test information using reference test information for initialization with certification to provide the test result. The DMA mirror file contains specific information for test purposes as well as all DMA information. The modified drive 120 can write DMA information in a DMA mirror file to a DMA area of a disc, and can save the DMA information of the disc into the DMA mirror file. The test items of the DMA information to be verified upon initialization with certification will be described with reference to FIGS. 2 through 5.

Figure 2:
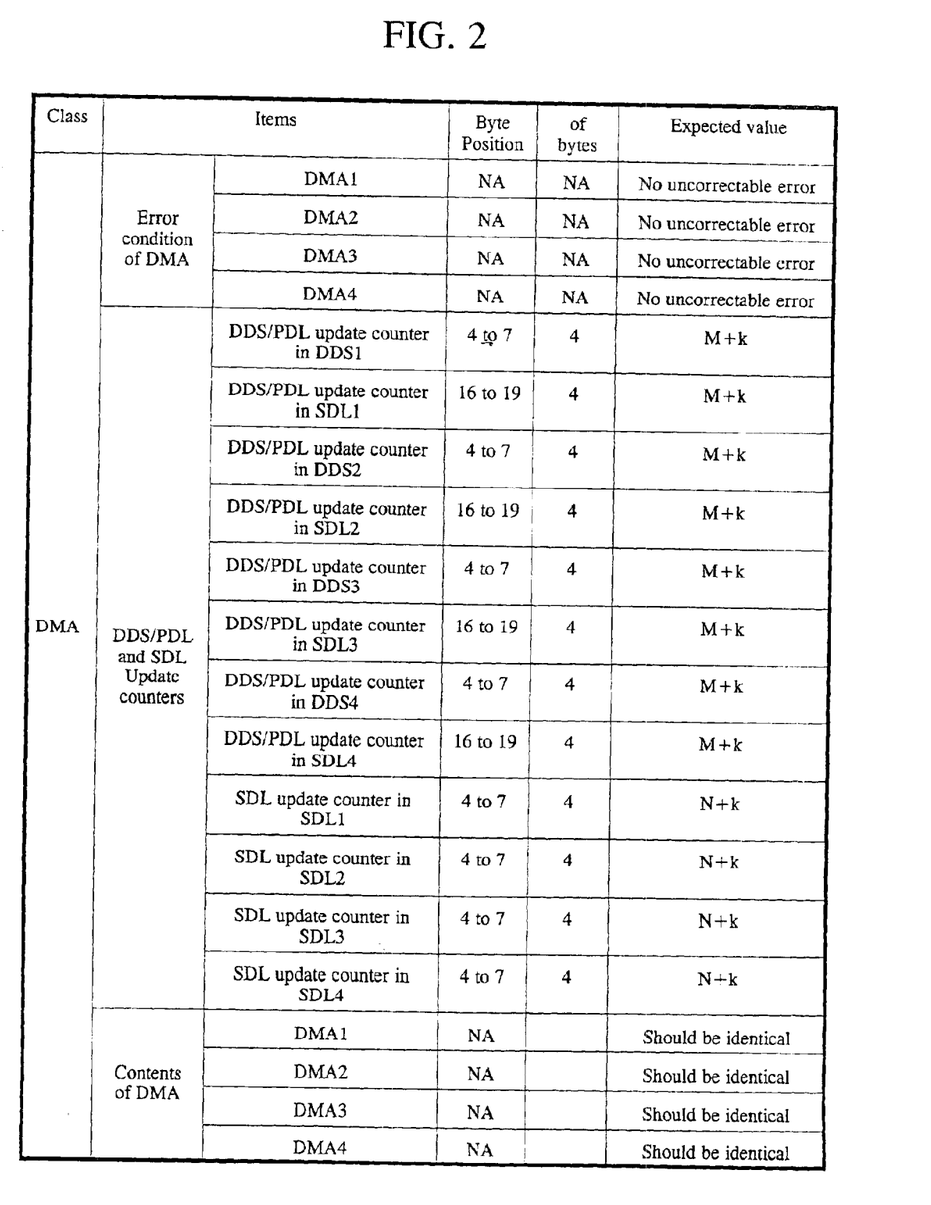
FIG. 2 is a table showing check items arranged for verifying a DMA structure upon initialization with certification.

As shown in FIG. 2, the check items for verifying a DMA structure are an error condition of DMA1 through DMA4, DDS/PDL update counters in DDS1 through DDS4 and in SDL1 through SDL4, SDL update counters in SDL1 through SDL4 and contents of DMA1 through DMA4.

The item of the error condition of DMA is for checking whether errors exist in DMAS, two of which are located in a lead-in area and two of which are located in a lead-out area. Uncorrectable errors must not exist in the four DMAs, DMA1, DMA2, DMA3 and DMA4. If any uncorrectable error is detected in any one of the DMAs, the pertinent verification is determined to be a failure, and a test needs to be retried using a new test disc.

In the case of initialization with certification, it is checked whether the values M, which indicate the values of DDS/PDL update counters in four DDSs, i.e., DDS1, DDS2, DDS3 and DDS4, and in four SDLs, i.e., SDL1, SDL2, SDL3 and SDL4, are "0," and whether the values k, which indicate increments of the counters representing a difference in the DDS/PDL update counters before and after a test, are "1." It is also checked whether the values of the eight DDS/PDL update counters are the same. Here, the value of each DDS/PDL update counter indicates the total number of update and rewrite operations, which are performed on a DDS/PDL block. The value of each DDS/PDL update counter must be set to "0" at the beginning of the initialization and increased by one when a DDS/PDL block is updated or rewritten. When the initialization is completed, the DDS/PDL and SDL blocks must have the same update counter values. Similarly, it is checked whether the values N, which indicate the values of SDL update counters in four SDLs, i.e., SDL1, SDL2, SDL3 and SDL4, are "0," and whether the values k, which indicate increments of the SDL update counters representing a difference in the SDL update counters before and after the test, are "1." It is also checked whether the values of the four SDL update counters are the same.

The basic structure of the DMA before certification for detecting defects on a disc begins, is recorded. Under the state in which the value of a bit indicating "in-progress" in a disc certification flag within the DDS of the DMA is set to "1," the value of each update counter is set to "0" which is an initial value when certification begins. The value of the update counter is increased by one when the DMA is updated by recording information on defects in the DMA after completion of certification.

To verify the contents of the DMA, it is checked whether the contents of the four DMAs, i.e., DMA1, DMA2, DMA3 and DMA4, are the same.

Figure 3:
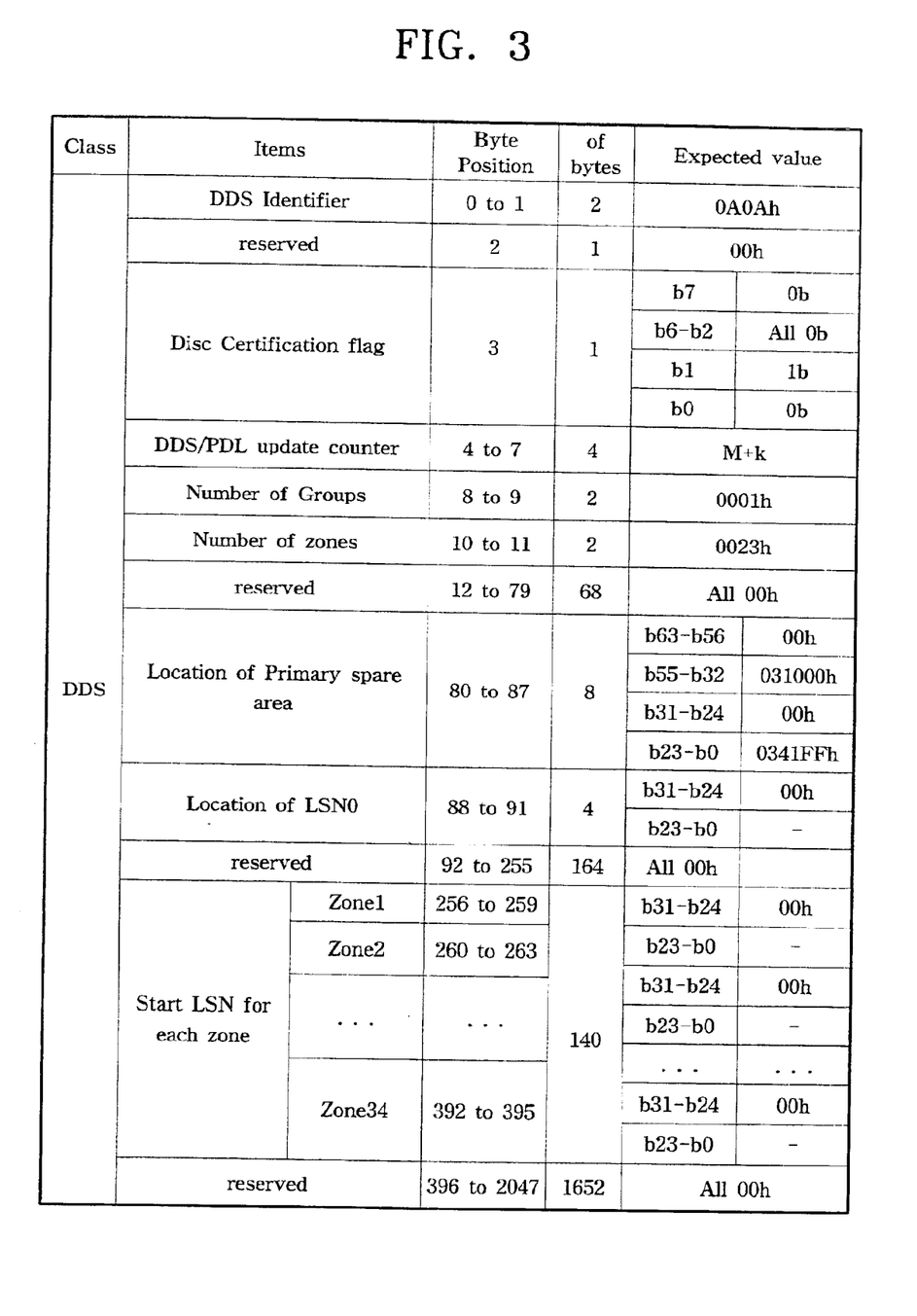
FIG. 3 is a table showing check items arranged for verifying a disc definition structure (DDS) upon initialization with certification.

As shown in FIG. 3, check items for verifying the DDS in the DMA include a DDS identifier, a disc certification flag, a DDS/PDL update counter, a number of groups, a number of zones, a location of a primary spare area, a location of a first logical sector number (LSN0), a start LSN for each zone, etc.

It is verified that the DDS identifier is "0A0Ah." It is checked whether the value of the bit position b7, which indicates in-progress/not in-progress in the one byte of the disc certification flag, is "0b." If the value of the bit position b7 is "0b," this indicates that formatting is completed. If the value of the bit position b7 is "1b," this indicates that formatting is in progress. Accordingly, when the value of the bit position b7 is "1b," this indicates that formatting is a failure. In addition, it is checked whether reserved bit positions b6 through b2 in the disc certification flag are all "0b," and it is checked whether the value of a bit position b1 indicating a user certification flag is "0b." It is also checked whether the value of a bit position b0 indicating a disc manufacturer certification flag is "0b."

To verify the corresponding DDS/PDL update counter, it is checked whether a value M indicating the DDS/PDL update counter value is "0," and whether a value k indicating the increment of the counter is "1." It is also checked whether the value of the number of groups is "0001h," indicating that the number of groups is 1, and whether the value of the number of zones is "0023h," indicating that the number of zones is 35.

Moreover, it is checked whether the first sector number of a primary spare area is "031000h," and whether the last sector number of the primary spare area is "0341FFh." It is checked whether the location of LSN0 is determined based on the number of defects registered in the PDL, and whether the start LSN for every zone, that is, the start LSNs of the second zone, Zone1, through the 35th zone, Zone34 are determined based on the number of defects registered in PDL. Here, the defects registered in PDL are known physical defects on the C-1 disc. Even if other unknown defects exist on the C-1 disc, they are not considered in initialization with certification for a test disc. Every sector with the known defects on the C-1 disc must be registered in the PDL as a defective sector. In other words, through the test, it can be checked whether the structure of the PDL is correct, and it also can be checked whether a drive to be tested properly detects defects.

It is checked whether the remaining reserved areas (byte positions 396 to 2047) in the DDS structure are all "00h."

Additionally, a spare area for defect management on a disc is divided into a primary spare area, a secondary spare area and a supplementary spare area. The primary spare area, which is assigned first when a disc is initialized for replacement of defects, is primarily used for slipping replacement. The remaining spare area can be used as the secondary spare area for linear replacement. The secondary spare area, which is used for linear replacement of defects occurring while a disc is in use, is defined as a spare area, which has remained after the primary spare area is used for slipping replacement during initialization. Alternatively, the secondary spare area may be separately assigned. The supplementary spare area is used for linear replacement of defects occurring while the disc is in use. The supplementary spare area is additionally assigned while the disc is in use after initialization.

When a spare area for linear replacement is lacking during the use of a disc after initialization, a supplementary spare area for linear replacement is assigned in such a manner that the supplementary spare area is gradually increased by a predetermined size in a reverse direction starting from the end of a logical volume area in a file system. The supplementary spare area is also used in the reverse direction starting from the end of the logical volume area during linear replacement.

Figure 4:
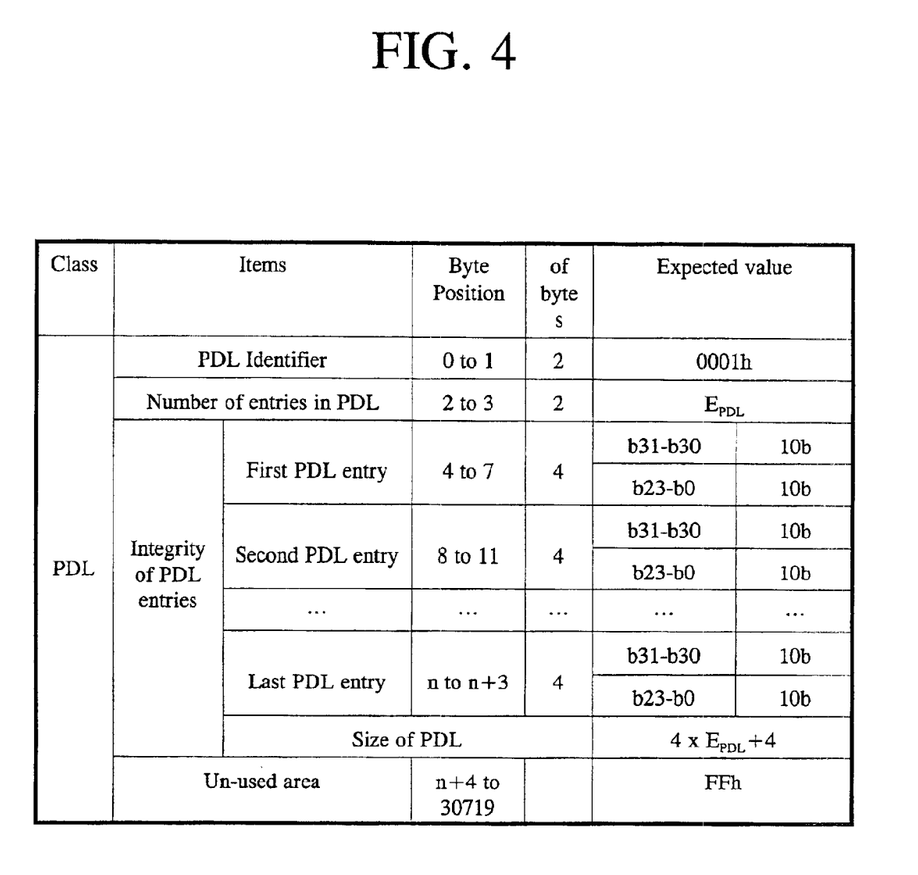
FIG. 4 is a table showing check items arranged for verifying a primary defect list (PDL) structure upon initialization with certification.

As shown in FIG. 4, check items for verifying the PDL structure in the DMA include a PDL identifier, a number of entries in the PDL, an integrity of the PDL entries and an un-used area.

It is checked whether the PDL identifier is "0001h." The number of entries in the PDL indicates the number of the known physical defects and defects which occur differently on each disc during manufacture. To verify the integrity of PDL entries, an entry type and a defective sector number are checked. It is checked whether the PDL entry type is "10b" indicating a G1-list of defective sectors which are detected during user certification. The defective sector numbers in the PDL are written in ascending order. After PDL entries corresponding to the number of the known physical defects are all written, and all information on defective sectors occurring differently on each disc during manufacture is written, it is checked whether the remaining un-used area is "FFh."

Figure 5:
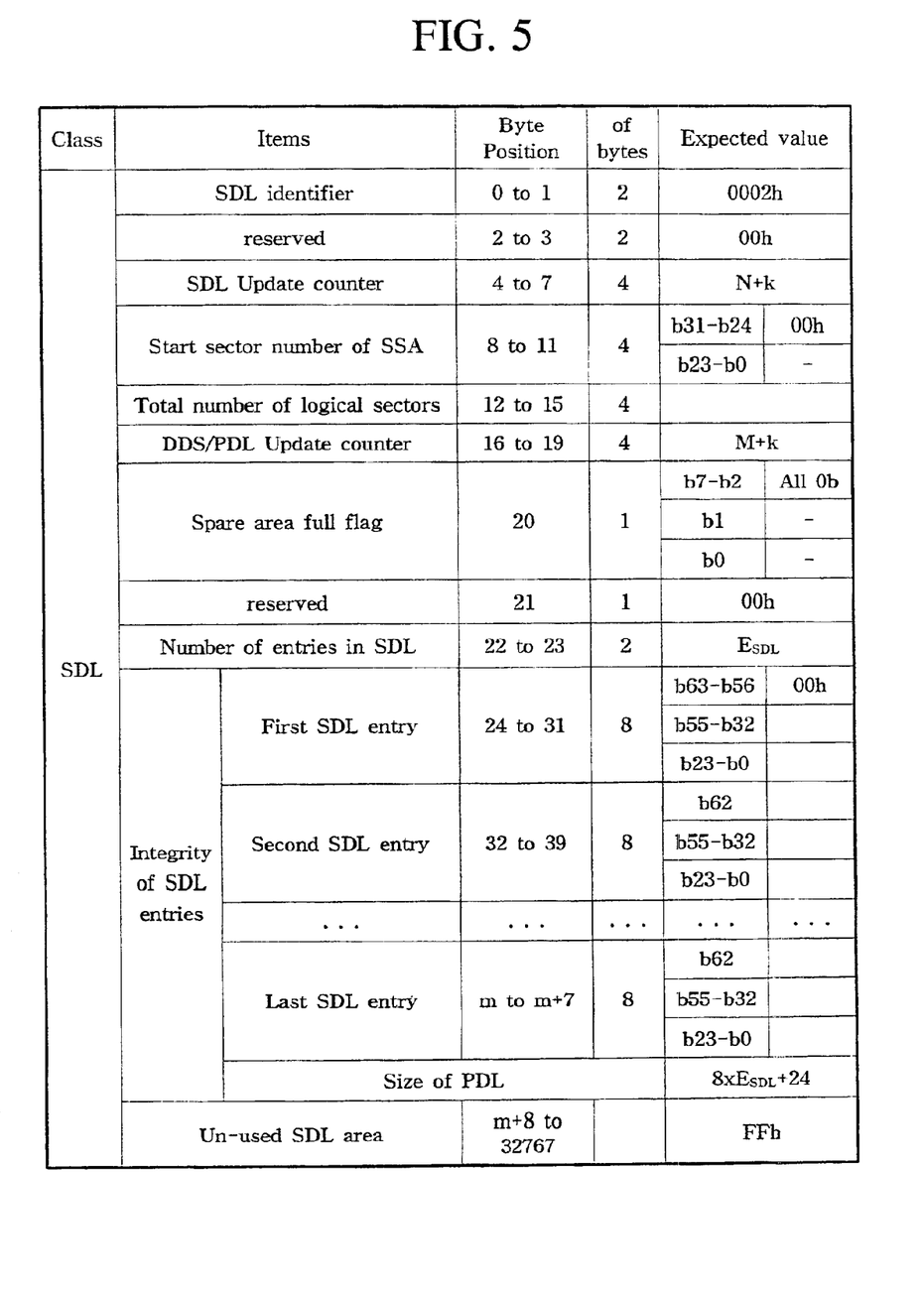
FIG. 5 is a table showing check items arranged for verifying a secondary defect list (SDL) structure upon initialization with certification.

As shown in FIG. 5, check items for verifying the SDL structure in the DMA include an SDL identifier, an SDL update counter, a start sector number of a secondary spare area (SSA), a total number of logical sectors, a DDS/PDL update counter, a spare area full flag, number of entries in the SDL, an integrity of the SDL entries, an un-used area, reserved areas, etc.

It is checked whether the SDL identifier is "0002h." To verify the corresponding SDL update counter, it is checked whether a value N indicating the SDL update counter value is "0," and whether a value k indicating the increment of the SDL update counter is "1." To verify the corresponding DDS/PDL update counter, it is checked whether a value M indicating the DDS/PDL update counter value is "0," and whether a value k indicating the increment of the DDS/PDL counter is "1."

In the case of initialization with certification, it is checked whether the start sector number of SSA and the total number of logical sectors have proper values according to the size of a secondary spare area, which is designated by the user during initialization. The spare area full flag must indicate that the secondary spare area is not full. The number of entries in the SDL must be set to "00h," which is a value usually indicating there is none. Moreover, because the total used area of the SDL is known, if the number of entries in the SDL is checked, the size of the un-used area of the SDL can be determined. Accordingly, it is checked whether the size of the area of the mirror file of the C-1 disc 13 is equal to the size of the un-used area of the SDL, which is known based on the number of entries in the SDL, and it is also checked whether the un-used area is set to "FFh." Also, it is checked whether the expected values of all the reserved areas are "00h." However, when the state of a C-1 disc used in a test is very bad, an SDL entry may be generated. Therefore, it is preferable to use a C-1 disc which is in a sufficiently good state.

Figure 6:
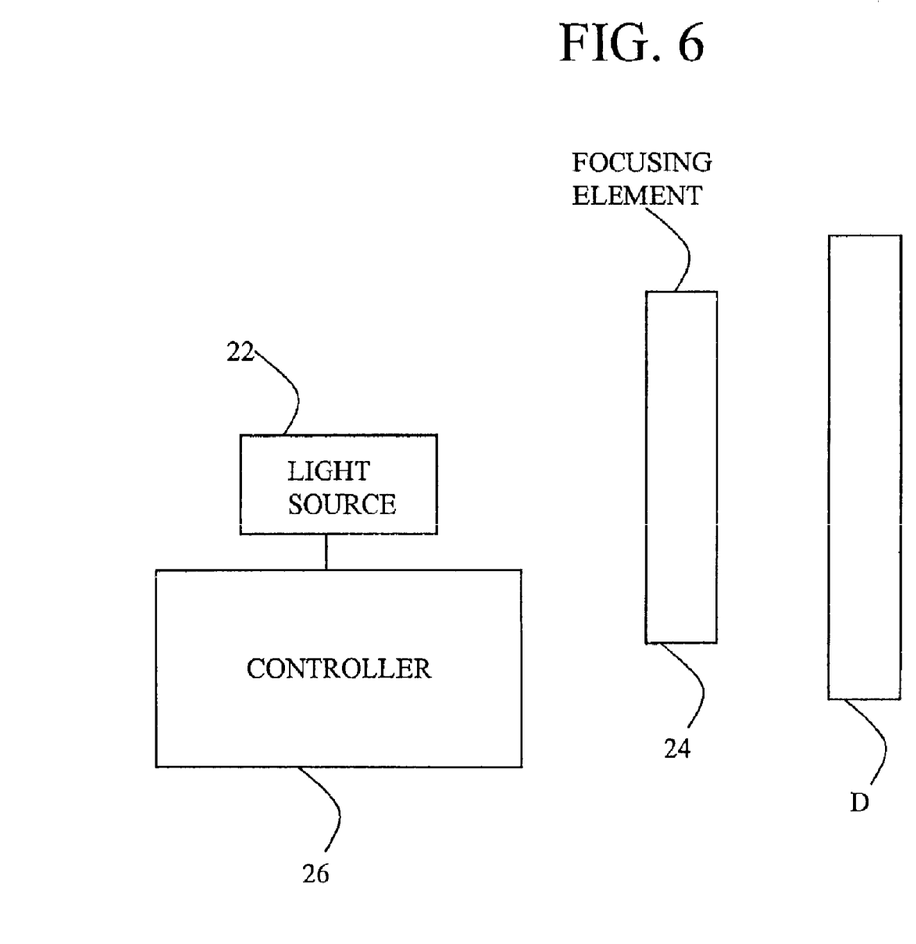
FIG. 6 is a block diagram of a drive to be tested shown in FIG. 1.

FIG. 6 shows the drive to be tested 110 having a light source 22 to emit light, a focusing element 24 to focus the light from the light source on a disc D, and a controller 26 which controls the light source 22. The verification process described above seeks to verify the proper operation of the controller 26.

As described above, the present invention easily verifies that a recording and reproducing apparatus properly translates and processes DMA information which is generated after initialization with certification, using a test disc with known physical defects.

Although a few preferred embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A method of verifying that defect management area (DMA) information is properly generated in a recording and reproducing apparatus which records or reproduces information on or from an optical disc with DMA information, the method comprising:
   generating test information, the test information comprising defect management information which is generated after performing initialization with certification on a test disc obtained by making known physical defects on a blank disc; and
   verifying the test information including the defect management information using reference test information for the initialization with certification to provide a test result.

2. The method of claim 1, wherein the test information is a DMA mirror file.

3. The method of claim 2, wherein the reference test information is a reference DMA mirror file.

4. The method of claim 3, wherein the reference DMA mirror file contains ideal data without errors.

5. The method of claim 1, wherein the generating comprises directly reading the test information from a DMA area on the test disc initialized with certification.

6. The method of claim 1, further comprising displaying the test result.

7. The method of claim 1, wherein the verifying comprises checking a DMA structure, a disc definition structure (DDS), a primary defect list (PDL) structure and a secondary defect list (SDL) structure, which form the test information, and checking whether PDL entries for a G1-list of physical defects known through certification exist.

8. The method of claim 1, wherein the verifying comprises:
   verifying a structure of DMA of the test information;
   verifying a disc definition structure (DDS) in the DMA;
   verifying a primary defect list (PDL) structure in the DMA; and
   verifying a secondary defect list (SDL) structure in the DMA.

9. The method of claim 8, wherein the verifying the DMA structure comprises checking an error condition, DDS/PDL and SDL update counters and contents of the DMA.

10. The method of claim 9 wherein:
    the checking of the error condition comprises checking whether errors exist in any one of four DMAs, which is the DMA written in four positions on the test disc, two of which are located in a lead-in area and two of which are located in a lead-out area on the test disc;
    the checking of the DDS/PDL update counters comprises checking whether the values of the DDS/PDL update counters in four DDSs and in four SDLs are "0," whether increments of the DDS/PDL counters representing a difference in the DDS/PDL update counters before and after the performing of the initialization with certification are "1," and whether the values of the eight DDS/PDL update counters are the same;
    the checking of the SDL update counters comprises checking whether values of SDL update counters in the four SDLs are "0," whether increments of the SDL update counters representing a difference in the SDL update counters before and after the performing of the initialization with certification are "1," and whether the values of the four SDL update counters are the same; and
    the checking of the contents of the DMA comprises checking whether the contents of the four DMAs are the same.

11. The method of claim 10, wherein the checking whether errors exist in any one of the four DMAs comprises:
    checking whether there are any uncorrectable errors in the four DMAs; and
    determining the verification to be a failure if any uncorrectable error is found.

12. The method of claim 8, wherein the verifying of the DDS comprises checking a DDS identifier, a disc certification flag, a DDS/PDL update counter, a number of groups, a number of zones, a location of a primary spare area, and a location of a first logical sector number and a start logical sector number for each zone.

13. The method of claim 12, wherein:
    the checking of the DDS identifier comprises checking whether the DDS identifier is a predetermined value;
    the checking of the disc certification flag comprises checking whether a value of a bit indicating in-progress and a value of a bit indicating disc manufacturer certification are both "0b" and whether the value of a bit indicating user certification is "1b," in the disc certification flag;
    the checking of the DDS/PDL update counter comprises checking whether the DDS/PDL update counter value is "0" and whether an increment of the DDS/PDL update counter representing a difference in the DDS/PDL update counter before and after the performing of the initialization with certification is "1";

the checking of the number of groups comprises checking whether the number of groups is a predetermined number;

the checking of the number of zones comprises checking whether the number of zones is a predetermined number;

the checking of the location of the primary spare area comprises checking whether first and last sector numbers of the primary spare area are predetermined sector numbers, respectively;

the checking of the first logical sector number comprises checking whether the location of the first logical sector number is determined based on a number of defects registered in the PDL; and the checking of the start logical sector number comprises checking whether the start logical sector number for each zone is determined based on the number of defects registered in the PDL.

14. The method of claim 13, wherein:

the bit indicating in-progress in the disc certification flag is b7, the bit indicating user certification is b1, the bit indicating disc manufacturer certification is b0, and bits b6 through b2 of the disc certification flag are reserved bits, and the checking of the disc certification flag further comprises checking whether a value of each of the reserved bits is "0b".

15. The method of claim 13, wherein the verifying of the DMA structure further comprises:

checking whether remaining reserved areas in the DDS each have a predetermined value.

16. The method of claim 8, wherein the verifying of the PDL structure comprises checking a PDL identifier, a number of entries in PDL and an integrity of the PDL entries.

17. The method of claim 16, wherein the:

the checking of the PDL identifier comprises checking whether the PDL identifier is a predetermined value;

the checking of the number of entries comprises checking whether the number of entries in the PDL is the same as a number of defects registered in the PDL; and the checking of the integrity of the PDL comprises checking whether the PDL entry type indicates a G1-list of defective sectors detected during user certification and checking corresponding defective sector numbers.

18. The method of claim 17, wherein the verifying of the PDL structure further comprises:

checking whether an unused area of the PDL is a predetermined value.

19. The method of claim 8, wherein the verifying of the SDL structure comprises checking an SDL identifier, an SDL update counter, a start sector number of a secondary spare area (SSA), a total number of logical sectors, a DDS/PDL update counter, a spare area full flag, a number of entries in the SDL, an integrity of the SDL entries, an un-used area, and reserved areas.

20. The method of claim 19, wherein:

the checking of the SDL identifier comprises checking whether the SDL identifier is a predetermined value;

the checking of the SDL update counter comprises checking whether the SDL update counter value is "0" and whether an increment of the SDL update counter representing a difference in the SDL update counter before and after the performing of the initialization with certification is "1";

the checking of the DDS/PDL update counter comprises checking whether the DDS/PDL update counter value is "0" and whether an increment of the DDS/PDL update counter representing a difference in the DDS/PDL update counter before and after the performing of the initialization with certification is "1";

the checking of the start sector of the SSA and the total number of logical sectors comprises checking whether the start sector number of the SSA and the total number of logical sectors are properly set according to the size of the SSA which is designated by a user;

the checking of the spare area full flag, the number of the entries of the SDL and the integrity of the SDL entries comprises checking whether the spare area full flag indicates that the secondary spare area is not full, whether the number of entries in the SDL is set to "00h" indicating that no entries exist, and whether information on the SDL entries does not exist; and the checking of the un-used area and the reserved areas comprises checking a size of the un-used area of the SDL and whether the un-used area is a predetermined value, and whether the reserved areas are predetermined values.

21. The method of claim 20, wherein the verifying of the SDL structure further comprises:

checking whether an unused area of the SDL is a predetermined value.

22. The method of claim 1, wherein the recording and reproducing apparatus is a digital versatile disc-random access memory (DVD-RAM).

23. A method of verifying whether defect management area (DMA) information is properly generated or updated in a recording and reproducing apparatus which records or reproduces information on or from an optical disc with the DMA information, the method comprising:

generating test information from the DMA information, which is generated after performing initialization with certification; and executing a test for verifying the test information including the DMA information using reference test information.

24. The method of claim 23, wherein the test information is a DMA mirror file and the reference test information is a reference DMA mirror file.

25. The method of claim 23, wherein the executing the test comprises:

checking a structure of a DMA, a disc definition structure (DDS) of the DMA, a primary defect list (PDL) structure and a secondary list (SDL) structure of the DMA, which form the test information.

26. An apparatus for testing a recording and reproducing apparatus which records or reproduces information on or from a recordable and reproducible optical disc with defect management area (DMA) information to check whether the DMA information is properly generated, the apparatus comprising:

a modified drive unit generating test information from the generated DMA information of a test disc, which is obtained after the recording and reproducing apparatus performs initialization with certification on the test disc; and a verifier comparing the test information including the DMA information with predetermined test information of the initialization with certification, to verify a test result.

27. The apparatus of claim 26, wherein the test information is a DMA mirror file and the predetermined test information is a reference DMA mirror file.

28. The apparatus of claim 26, wherein the modified drive unit reads the test information from a DMA area on the test disc and provides the test information to the verifier.

29. The apparatus of claim 26, wherein the test disc is a disc on which known physical defects are formed on a blank disc prior to the performing of the initialization with certification.

30. The apparatus of claim 26, wherein the verifier compares the test information with the predetermined test information by checking a structure of a DMA, a disc definition structure (DDS) of the DMA, a primary defect list (PDL) structure and a secondary list (SDL) structure of the DMA, which form the test information.

31. A method of verifying whether a recording and reproducing apparatus reads and processes defect management area (DMA) information properly, comprising:
performing initialization with certification on a test disc containing predetermined known physical defect information, to generate test information; and
comparing the test information, including defect management information, with reference test information to determine a verification of the recording and reproducing apparatus.

32. The method of claim 31, wherein the performing of the initialization with certification comprises:
having the recording and reproducing apparatus perform the initialization with certification on the test disc, to generate a disc with the DMA information, and
reading only the DMA information from the disc using a reference drive, to generate a DMA mirror file as the test information;
wherein the reference test information is a reference DMA mirror file.

33. The method of claim 31, wherein the comparing comprises:
checking a structure of a DMA, a disc definition structure (DDS) of the DMA, a primary defect list (PDL) structure and a secondary list (SDL) structure of the DMA, which form the test information.

34. A method of verifying whether a recording and reproducing apparatus reads and processes defect management area (DMA) information properly, comprising:
performing certification with initialization on a test disc containing predetermined known physical defects using the reproducing and recording apparatus to generate the DMA information;
generating test information from the generated DMA information; and
comparing the test information, including the generated DMA information, with reference test information to determine a verification of the recording and reproducing apparatus.

35. The method of claim 34, wherein the comparing comprises:
checking a structure of a DMA, a disc definition structure (DDS) of the DMA, a primary defect list (PDL) structure and a secondary list (SDL) structure of the DMA, which form the test information.

36. DMA information which is properly generated by a recording and reproducing apparatus using the process of:
performing certification with initialization on a test disc using the reproducing and recording apparatus to generate the DMA information;
generating test information from the generated DMA information; and
comparing the test information, including the generated DMA information, with reference test information to determine a verification of the recording and reproducing apparatus.

37. The DMA information of claim 36, wherein the DMA information comprises a structure of the DMA, a disc definition structure (DDS) of the DMA, a primary defect list (PDL) and a secondary list (SDL) structure of the DMA, wherein the comparing comprises:
checking the structure of the DMA, the disc definition structure (DDS) of the DMA, the primary defect list (PDL) structure and the secondary list structure (SDL) of the DMA, which form the test information.

38. A recording and reproducing apparatus verified according to the process of:
performing certification with initialization on a test disc to generate DMA information;
generating test information from the generated DMA information; and
comparing the test information, including the DMA information, with reference test information to determine a verification of the recording and reproducing apparatus.

39. The recording and reproducing apparatus of claim 38, wherein the comparing the test comprises:
checking a structure of a DMA, a disc definition structure (DDS) of the DMA, a primary defect list (PDL) structure and a secondary list (SDL) structure of the DMA, which form the test information.

40. A recording and reproducing apparatus verified according to the process of:
performing initialization with certification on a test disc containing predetermined defect information to generate test information; and
comparing the test information, including defect management information, with reference test information to determine a verification of the recording and reproducing apparatus.

41. The recording and reproducing apparatus of claim 40, wherein the comparing the test comprises:
checking a structure of a DMA, a disc definition structure (DDS) of the DMA, a primary defect list (PDL) structure and a secondary list (SDL) structure of the DMA, which form the test information.

42. An apparatus for testing a recording and reproducing apparatus which records or reproduces information on or form a recordable and reproducible optical disc with defect management area information to check whether DMA information is properly generated, the apparatus comprising:
a modified driver generating test information based on the DMA information of a test disc generated by a reproducing device performing initialization with certification on the test disc; and
a verifier comparing the test information, including the DMA information, with reference test information to determine a verification of the recording and reproducing apparatus.

43. The apparatus of claim 42, wherein the modified driver reads only the DMA information from the test disc, to generate a DMA mirror file as the test information;
wherein the reference test information is a reference DMA mirror file.

44. The apparatus of claim 42, wherein the verifier receives the reference test information from an external source to make the comparison between the test information and the reference test information.

45. The apparatus of claim 42, wherein the verifier compares the test information with the predetermined test information by checking a structure of a DMA, a disc definition structure (DDS) of the DMA, a primary defect list (PDL) structure and a secondary list (SDL) structure of the DMA, which form the test information.

46. A method of manufacturing a compliant recording and reproducing apparatus, comprising:
   manufacturing an uncertified recording and reproducing apparatus that updates and generates defect management area (DMA) information; and
   verifying whether the uncertified recording and reproducing apparatus is compliant with a standard, said verifying comprising:
   performing initialization with certification on a test disc to generate test information, and
   comparing the test information, including defect management information, with reference test information to determine a verification of the recording and reproducing apparatus, the verification indicating that the uncertified recording and reproducing apparatus is compliant with the standard.

47. The method of claim 46, wherein the comparing comprises:
   checking a structure of a DMA, a disc definition structure (DDS) of the DMA, a primary defect list (PDL) structure and a secondary list (SDL) structure of the DMA, which form the test information.

48. A disc recording and reproducing apparatus for recording and reproducing information on an optical disc, comprising:
   a light source to emit a light;
   a focusing element to focus the light onto the optical disc to record and reproduce the information; and
   a controller to control said light source, said controller being verified to update and generate defect management area (DMA) information by
      performing initialization with certification on a test disc to generate test information, and
      comparing the test information, including the DMA information, with reference test information to determine the verification of the recording and reproducing apparatus.

49. The disc recording and reproducing apparatus of claim 48, wherein the controller checks a structure of a DMA, a disc definition structure (DDS) of the DMA, a primary defect list (PDL) structure and a secondary list (SDL) structure of the DMA, which form the test information.

50. A disc recording and reproducing apparatus for recording and reproducing information on an optical disc:
   a light source to emit a light;
   a focusing element to focus the light onto the optical disc for recording and reproducing the information; and
   a controller to control said light source and to update and generate defect management area information after performing initialization with certification on the optical disc so that the defect management information is compliant with a standard by comparing the defect management information with reference information.

51. The disc recording and reproducing apparatus of claim 50, wherein the controller:
   is verified to update and generate the defect management area (DMA) information according to the standard using test information generated by performing initialization with certification, and
   checks a structure of a DMA, a disc definition structure (DDS) of the DMA, a primary defect list (PDL) structure and a secondary list (SDL) structure of the DMA, which form the test information.

52. An apparatus for testing a recording and reproducing apparatus which records or reproduces information on or from a recordable and reproducible optical disc with defect management area (DMA) information to check whether DMA information is properly generated, the apparatus comprising:
   a modified drive unit generating test information from the DMA information recorded on the test disc, which is obtained after the recording and reproducing apparatus performs initialization with certification on a test disc obtained by making known physical defects on a blank disc; and
   a verifier verifying a test result by verifying the test information, including the DMA information, using reference test information for initialization with certification.

53. The apparatus of claim 52, wherein the test information is a DMA mirror file.

54. The apparatus of claim 53, wherein the modified drive unit records the test information directly from a DMA area on the test disc initialized with certification.

55. The apparatus of claim 52, wherein the verifier checks a DMA structure, a disc definition structure (DDS), a primary defect list (PDL) structure and a secondary defect list (SDL) structure, which form the test information, and checks whether PDL entries for a G1-list of physical defects known through certification exist.

56. The apparatus of claim 55, wherein the verifier checks the DMA structure by checking an error condition of the DMA, DDS/PDL and SDL update counters and contents of the DMA.

57. The apparatus of claim 56, wherein the verifier checks whether errors exist in any of four DMAs, which is the DMA written in four positions on the test disc, two of which are located in a lead-in area and two of which are located in a lead-out area on the test disc, whether values of the DDS/PDL update counters in four DDSs and in four SDLs are "0," whether increments of the eight DDS/PDL update counters representing a difference in the DDS/PDL update counters before and after the performing of the initialization with certification are "1," whether the values of the eight DDS/PDL update counters are the same, whether values of the SDL update counters in the four SDLs are "0," whether increments of the SDL update counters representing a difference in the SDL update counters before and after the performing of the initialization with certification are "1," whether the values of the four SDL update counters are the same, and whether contents of the four DMAs are the same.

58. The apparatus of claim 55, wherein the verifier checks the DDS by including a DDS identifier, a disc certification flag, a DDS/PDL update counter, a number of groups, number of zones, a location of a primary spare area, a location of a first logical sector number and a start logical sector number for each zone.

59. The apparatus of claim 58, wherein the verifier checks whether the DDS identifier is a predetermined value, whether a value of a bit indicating in-progress and a value of a bit indicating disc manufacturer certification are both "0b" in the disc certification flag, whether a value of a bit indicating user certification is "1b" in the disc certification flag, whether the DDS/PDL update counter value is "0,"

whether an increment of the DDS/PDL update counter representing a difference in the DDS/PDL update counter before and after the performing of the initialization with certification is "1," whether the number of groups and the number of zones are predetermined numbers, respectively, whether the first and last sector numbers of the primary spare area are predetermined sector numbers, respectively, whether the location of the first logical sector number is determined based on a number of defects registered in the PDL, and whether the start logical sector number for each zone is determined based on the number of defects registered in the PDL.

60. The apparatus of claim 55, wherein the verifier checks the PDL structure by checking a PDL identifier, a number of entries in the PDL and an integrity of the PDL entries.

61. The apparatus of claim 60, wherein the verifier checks whether the PDL identifier is a predetermined value, whether the number of entries in the PDL is the same as a number of defects registered in the PDL, and whether the PDL entry type indicates a G1-list of defective sectors detected during user certification, and checks corresponding defective sector numbers.

62. The apparatus of claim 55, wherein the verifier checks the SDL structure by checking an SDL identifier, an SDL update counter, a start sector number of a secondary spare area (SSA), a total number of logical sectors, a DDS/PDL update counter, a spare area full flag, a number of entries in SDL, and an integrity of the SDL entries.

63. The apparatus of claim 62, wherein the verifier checks whether the SDL identifier is a predetermined value, whether the SDL update counter value is "0" and whether an increment of the SDL update counter representing a difference in the SDL update counter before and after the performing of the initialization with certification is "1," whether the DDS/PDL update counter value is "0," whether an increment of the DDS/PDL counter representing a difference in the DDS/PDL update counter before and after the performing of the initialization with certification is "1," whether the start sector number of the SSA and the total number of logical sectors are properly set according to a size of the SSA which is designated by a user, whether the spare area full flag indicates that the secondary spare area is not full, whether the number of entries in the SDL is set to "00h" indicating that no entries exist, and whether information on the SDL entries does not exist.

* * * * *